US008398910B2

(12) United States Patent
Kastner et al.

(10) Patent No.: US 8,398,910 B2
(45) Date of Patent: Mar. 19, 2013

(54) METHOD FOR MANUFACTURING A FIBRE-COMPOSITE COMPONENT, FIBRE-COMPOSITE COMPONENT AND FIBRE-COMPOSITE FUSELAGE COMPONENT OF AN AIRCRAFT

(75) Inventors: Wolfgang Kastner, Buxetehude (DE); Thomas Grauerholz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 193 days.

(21) Appl. No.: 12/866,375

(22) PCT Filed: Feb. 9, 2009

(86) PCT No.: PCT/EP2009/000891
§ 371 (c)(1),
(2), (4) Date: Aug. 5, 2010

(87) PCT Pub. No.: WO2009/098088
PCT Pub. Date: Aug. 13, 2009

(65) Prior Publication Data
US 2011/0024562 A1    Feb. 3, 2011

Related U.S. Application Data

(60) Provisional application No. 61/027,168, filed on Feb. 8, 2008.

(30) Foreign Application Priority Data

Feb. 9, 2008    (DE) .......................... 10 2008 008 386

(51) Int. Cl.
*B29C 70/44*    (2006.01)

(52) U.S. Cl. .................... 264/258; 244/129.3; 156/307.1

(58) Field of Classification Search ................. 244/119, 244/120, 129.1, 129.3; 264/258; 156/196, 156/212, 307.1–307.7
See application file for complete search history.

(56) References Cited

U.S. PATENT DOCUMENTS
(Continued)

FOREIGN PATENT DOCUMENTS
DE    69315238 T2    6/1998
DE    69706403 T2    5/2002
(Continued)

OTHER PUBLICATIONS

International Preliminary Report on Patentability for corresponding PCT application PCT/EP08/000891, dated Sep. 7, 2010.

(Continued)

*Primary Examiner* — Timothy D Collins
*Assistant Examiner* — Jamie S Stehle
(74) *Attorney, Agent, or Firm* — Matthew B. Dernier LLP (57) ABSTRACT

A method for manufacturing a fiber-composite component with a cladding field and a primary component for reinforcing the fiber-composite component includes the steps of: applying a prepreg semifinished product to a mold to form the cladding field, where in the prepreg semifinished product fibers extend in some sections in a curved manner according to an assumed flow force path in the cladding field of the component to be manufactured; curing the prepreg semifinished product; applying layers of a semifinished textile product to the cured prepreg semifinished product to form the primary component; impregnating the semifinished textile product with matrix material; and curing the assembly comprising pre-cured prepreg semifinished product and semifinished textile product; a fiber-composite component with at least one structural component and a skin section connected to said structural component with a recess as well as a fiber-composite fuselage component of an aircraft with a shell component with at least one recess and with a structural component formed as a frame component.

25 Claims, 3 Drawing Sheets

U.S. PATENT DOCUMENTS

| | | | |
|---|---|---|---|
| 4,230,293 A * | 10/1980 | Hamm et al. | 244/119 |
| 7,419,627 B2 | 9/2008 | Sheu | |
| 7,727,449 B2 | 6/2010 | Lorenz et al. | |
| 2003/0222371 A1 | 12/2003 | Edelmann et al. | |
| 2004/0051214 A1 | 3/2004 | Sheu | |
| 2004/0123551 A1 | 7/2004 | Liang et al. | |
| 2004/0265406 A1 | 12/2004 | Lorenz et al. | |
| 2006/0060705 A1 | 3/2006 | Stulc et al. | |
| 2007/0218795 A1 | 9/2007 | Taggart | |
| 2008/0078876 A1 * | 4/2008 | Baggette et al. | 244/129.3 |
| 2008/0169380 A1 | 7/2008 | Jackson et al. | |

FOREIGN PATENT DOCUMENTS

| | | |
|---|---|---|
| DE | 10153875 A1 | 5/2003 |
| DE | 10156123 A1 | 5/2003 |
| DE | 60303484 T2 | 10/2006 |
| DE | 102007017446 A1 | 10/2008 |
| EP | 1308265 A1 | 5/2003 |
| EP | 1400341 A1 | 3/2004 |
| FR | 2686080 A1 | 7/1993 |
| WO | 9305888 A | 4/1993 |
| WO | 9730651 A2 | 8/1997 |
| WO | 2005115839 A | 12/2005 |

OTHER PUBLICATIONS

International Search Report for corresponding PCT application PCT/EP08/000891, dated Nov. 27, 2009.

* cited by examiner

METHOD FOR MANUFACTURING A FIBRE-COMPOSITE COMPONENT, FIBRE-COMPOSITE COMPONENT AND FIBRE-COMPOSITE FUSELAGE COMPONENT OF AN AIRCRAFT

CROSS REFERENCE TO RELATED APPLICATIONS

This application claims priority to PCT Application No. PCT/EP2009/000891, filed Feb. 9, 2009; which claims priority to German Patent Application No. DE 10 2008 008 386, filed Feb. 9, 2008, and claims the benefit to U.S. Provisional Patent Application No. 61/027,168, filed Feb. 8, 2008, the entire disclosures of which applications are hereby incorporated by reference.

BACKGROUND

The invention relates to a method for manufacturing a fibre-composite component, to a fibre-composite component comprising at least one structural component and a skin section, connected to the aforesaid, comprising a recess, as well as to a fibre-composite fuselage component of an aircraft comprising a shell component with at least one recess and with a structural component formed as a frame component.

From the general state of the art it is known to manufacture fibre-composite components from semifinished products made with the application of the prepreg technique. In these methods a large-area skin field is used as a cladding field, and stiffening profiles are used as integral reinforcements. The skin field can be manufactured with the use of an automatic laying process. This method is associated with a disadvantage in that, in contrast to automatic laying of the cladding field, stiffening profiles whose geometry cannot be unwound need to be applied manually. Such a manual process step increases production costs in the manufacture of the integrally-reinforced cladding fields.

From document US 2004/0123551 A1 a fiber-composite composite with a structural component and a skin section, connected to the aforesaid, comprising a recess is known.

Document US 2007/0218795 describes a method for lamination of fiber composite materials by means of a conveyor device.

Document US 2003/0222371 A1 describes a method for producing a fiber prepreg which is used for manufacturing a fiber reinforced ring frame component for aircraft windows.

Document WO 2005/115839 discloses a window frame made of a fiber reinforced material for installation in a fuselage of an aircraft.

In document US 2006/0060705 A1 an aircraft structure is described which is constructed by stiffeners and panel portions mounted thereon. On the aircraft structure an elongate strap is mounted comprising an aperture for a window.

From DE 101 56 123 A1 a method for manufacturing fibre-reinforced plastic components from a prepreg semifinished product and from a dry semifinished textile product is known. For integral stiffening, the dry semifinished textile product is positioned, by means of a manufacturing device, on the prepreg semifinished product, and the build-up of a vacuum is provided for the subsequent resin injection into the dry semifinished textile product. Subsequently, curing of the prepreg semifinished product with the impregnated semifinished textile product applied to said prepreg semifinished product takes place in an autoclave. Such a method for manufacturing a fibre-composite component is associated with a disadvantage in that due to pore formation between the prepreg semifinished product and the semifinished textile product an internal laminate quality may arise which does not meet the stringent requirements, in particular relating to component quality, of aeronautical components.

From DE 697 06 403 T2 an attachment device made of plastic is known, which attachment device comprises a curved support with an I-profile, wherein it is provided for the fibres to extend in the flanges in one direction.

SUMMARY OF THE INVENTION

It is the object of the invention to provide a method for manufacturing a fibre-composite component, which method can be implemented with minimal expenditure to provide an optimal component structure.

Furthermore, it is the object of the invention to provide a fibre-composite component with a skin section comprising a recess, a structural component that is connected to the cladding section, and a fibre-composite component of an aircraft, which component is built so as to comprise a lightweight construction, and in a simple or efficient manufacturing method provides optimal strength.

This object is met by one or more embodiments disclosed and described herein. Further embodiments are also disclosed and described herein.

The cladding section to be manufactured according to the invention can, in particular, be the exterior skin of an aircraft component and, in particular, of an aircraft fuselage. In this arrangement the exterior skin can be the exterior skin of a fuselage section.

According to the method according to the invention for manufacturing a fibre-composite component with a cladding field in the form of a skin section or shell component, which can, in particular, be an aircraft shell component, for example a fuselage section, prepreg semifinished products or prepreg semifinished-product cutouts are used to form a primary component, in particular in the form of a structural component, for example a frame element or a stringer for reinforcing the cladding field, as well as prepreg semifinished products or prepreg semifinished-product cutouts to form the cladding field. To connect the structural component with the cladding field, in addition a semifinished textile product or at least a layer of a semifinished textile-product cutout can be used that is placed between the prepreg semifinished products in order to form the cladding field and the structural component. The primary component of the component to be manufactured can, in particular, be a stringer, a transverse frame element and/or a frame component of a recess to form a door frame or window frame of an aircraft fuselage. In this arrangement, in order to create the cladding field or a structure comprising skin layers, the prepreg semifinished product is applied to a mould and is subsequently cured.

The prepreg semifinished product used comprises fibres that extend in some sections in a curved manner according to an assumed stress flow path or force flow path in the cladding field of the component to be manufactured. The stress flow path arises, in particular, from lines of equal stress, and, in particular, from the main stress lines when external forces act on the component to be manufactured during operational use of said component. In particular, the fibres extend at least in some sections along stress lines that result in operation of the component to be manufactured with the arrangement comprising the cladding and the primary component. These stress lines or fibres extend, in particular, starting from a longitudinal direction of the cladding field or of the component with a curvature in which the fibres increasingly align in the direction of the longitudinal direction of the primary component, which direction extends transversely to the longitudinal direction of the cladding field or component, and which comprises the primary component at the location at which the imaginary extension of the longitudinal extension according to the first-mentioned longitudinal direction of the fibres meets the primary component. This path of the stress lines can extend on both sides of the primary component when viewed in longitudinal direction of the cladding field or component.

According to the invention, thus a method is provided for manufacturing a fibre-composite component with at least one structural component and a skin section connected to said structural component, in particular with a recess, wherein the structural component is situated and designed in such a manner that the structural component extends along at least one section of the recess. In this arrangement, applying layers of prepreg semifinished mats to form a skin-section blank to a mould to form the skin section takes place, wherein the prepreg semifinished mats in their initial state in each case comprise fibres that extend along the longitudinal direction of the prepreg semifinished mats, wherein a multitude of the prepreg semifinished mats are laid in several layers in such a manner that a first section extends in the non-curved state in longitudinal direction relative to the initial state; at least one second section extends in a curved manner in longitudinal direction relative to the initial state with a largest change in direction of at least 15 degrees relative to the longitudinal extension of the fibres in the initial state of the respective prepreg semifinished mat; and a third section extends in a non-curved state in longitudinal direction relative to the initial state, so that the fibres of these prepreg semifinished mats extend along the lines of equal stress, which lines occur with an assumed load of the component to be manufactured, when the aforesaid is exposed to external forces, and which lines lead around an edge section of the recess.

Subsequently, pre-curing the prepreg semifinished product takes place in order to stabilise the skin-section blank. Furthermore, the invention provides for the application of layers of a prepreg semifinished product to form the structural component on the cured skin-section blank and for curing the assembly comprising the pre-cured prepreg semifinished product for the skin section and the prepreg semifinished product for the structural component.

In the method according to the invention, curing the fibre-composite component thus takes place in two curing steps, wherein in a first step to form a skin-section blank the prepreg semifinished product is pre-cured, i.e. its form is at least stabilised, and in a second step the assembly comprising the pre-cured prepreg semifinished product for the skin section and the prepreg semifinished product for the structural component are cured so that between the cladding field and the reinforcement component high laminate quality is achieved, e.g. without the formation of gas inclusions. With the method according to the invention it is possible, in particular, to meet the stringent requirements relating to the quality of components for aircraft, for example a low pore count, a certain fibre volume content, and interior laminate quality. There is a further advantage in that the layer design of the reinforcement parts can be applied to the cladding field in a topology-oriented manner with a fibre angle orientation that matches the force flow path and stress flow path. As a result of this, the reinforcement fibres are applied at least in part in a force-weighted and stress-weighted manner.

According to an exemplary embodiment of the invention, a CFP prepreg semifinished product, in particular a unidirectional CFP prepreg semifinished product, is used as a prepreg semifinished product.

The fibres of the prepreg semifinished product can at least in part extend in a curved manner and in sections along stress lines in the cladding of the component to be manufactured, which stress lines occur in the use of said component with the cladding and the primary component.

In order to form the cladding field, the prepreg semifinished product can be applied to the mould by means of a tape-laying device. In particular with the use of such automatic laying devices comprising one or several movable application heads, by means of which a prepreg semifinished product, for example a unidirectional CFP prepreg tape (UD-CFP prepreg tape) is applied to a work surface of a mould, in the field of manufacturing this results in shorter throughput times with a greater usage factor of the manufacturing potential and, resulting from this, reduced costs of manufacturing the composite material products. The unproductive times resulting from manual work can be reduced to a minimum while high quality manufacturing is achieved.

In the method according to the invention the fibres of the prepreg semifinished mats for the skin section and the structural component can be carbon fibres, glass fibres and/or aramid fibres.

The prepreg semifinished product can, in particular, be cured in an autoclave. Curing preferably takes place according to a predetermined temperature gradient and vacuum gradient under pressure in the autoclave. In this arrangement the process parameters can be set and optimised with reference to the materials values of the prepreg resin. In this arrangement it can be provided for the dependence of the injection resin on the materials characteristics to be taken into account in order to achieve a strength-optimised and weight-optimised component.

The prepreg semifinished products can, in particular, form overlapping connections and circumferential joints. This makes it possible to reduce the number of conventional connecting elements, for example longitudinal rivets and circumferential rivets.

According to an exemplary embodiment of the method according to the invention, the fibres of the prepreg semifinished mats can extend along the longitudinal direction of the respective mats, which longitudinal direction extends in the longitudinal extension of the prepreg semifinished mats, wherein the orientations of said fibres at each position along the longitudinal direction of the respective prepreg semifinished mat differ from each other by a maximum of 2.5 degrees ($\alpha 1$) and/or extend with a difference ($\alpha 2$) of at most 5 degrees from the longitudinal direction of the respective prepreg semifinished mat.

In the method according to the invention a multitude of the prepreg semifinished mats or all of the prepreg semifinished mats used to form the skin section can be laid in several layers in such a manner that a first section of at least 0.5 m length in the uncurved state extends in longitudinal direction relative to the initial state of the respective prepreg semifinished mat; at least one second section of at least 2.0 m length in the curved state extends along the longitudinal direction, when compared to the initial state, at a maximum change in direction ($\alpha 3$) of at least 15 degrees relative to the longitudinal extension of the fibres in the initial state of the respective prepreg semifinished mat; and a third section of at least 0.5 m length extends in the non-curved state of the prepreg semifinished mat when compared to the initial state.

The prepreg semifinished mats used can, in particular, comprise a width (B) of between 0.5 m and 2.0 m and a length (L) of between 4 m and 25 m.

According to an exemplary embodiment of the method according to the invention, an edge section of the recess of the skin section formed in the method, which section is in close proximity to the second section, extends in a curved manner at a radius of 200 to 300 mm, while the fibres of the third section extend across their longitudinal direction when viewed in longitudinal direction of the fibres of the first section so as to be offset between 100 and 200 mm relative to each other.

Furthermore, it can be provided for an edge section of the recess, which edge section is in close proximity to the second section to extend in a curved manner at a radius of 100 to 200 mm, and for the fibres of the third section when viewed in their longitudinal direction to extend across the fibres of the first section so as to be offset between 200 and 400 mm relative to each other.

In this arrangement the recess can comprise an edge line that is closed along the circumference, wherein the structural component extends at least along a section of the edge of the recess in order to stiffen said edge line.

The component manufactured can, in particular, be a fuselage component of an aircraft. Furthermore, it can be provided for the recess to form a window cutout or door cutout of the fuselage component. In this arrangement the structural component on the component to be manufactured can be a stringer and/or a transverse frame element of an aircraft fuselage.

The structural component manufactured can form a frame component that encompasses the edge line of the window cutout or door cutout of the aircraft fuselage and can comprise: supporting-component sections that extend along the circumferential direction of the shell component; edge sections that extend along the longitudinal direction of the shell component; and a supporting-component section that extends in circumferential direction of the shell component (2); and corner regions which are connecting the edge sections and the respective supporting-component sections that extend along the circumferential direction of the shell component.

According to a further exemplary embodiment, the prepreg semifinished mats, whose at least one second section that is curved in longitudinal direction is placed in several layers, are laid in such a manner that in each case their first sections comprise a direction that intersects the supporting-component sections that extend in circumferential direction of the shell component; the curved second section extends along a corner region; and the third section extends along an edge section that extends along a longitudinal direction of the shell component. In this arrangement the fibres of the third section, when viewed across their longitudinal direction, can extend so as to be offset between 0.1 m and 1.0 m relative to each other when compared to the same fibres of the first section.

As an alternative or in addition, the prepreg semifinished mats, whose at least one second section that is curved in longitudinal direction is placed in several layers, are laid in such a manner that in each case their first sections comprise a direction that intersects the edge sections that extend in longitudinal direction of the shell component; the curved second section extends along a corner region; and the third section extends along a supporting-component section that extends along a circumferential direction of the shell component. In this arrangement the fibres of the third section, when viewed across their longitudinal direction, can extend so as to be offset between 0.1 m and 1.0 m relative to each other when compared to the same fibres of the first section.

Generally speaking, according to the invention the prepreg semifinished mats for forming the structural component can be laid on the main section together with the prepreg semifinished mats for forming the shell component in such a manner that that in relation to the longitudinal direction of the fuselage component to be produced they form longitudinal bandage arrangements, circumferential bandage arrangements and/or shear-type bandage arrangements of the fuselage component.

In the method according to the invention the prepreg semifinished products can be applied as doublers or a doubler arrangement, i.e. that several layers of prepreg semifinished products are laid one on top of the other. The at least one doubler can be applied to the cladding field in a sheet-like manner as a patch. In this context the term "patch" refers, in particular, to a reinforcement overlay applied to the cladding field in the case of high-rigidity primary components to be affixed to said cladding field, in particular for window frames or door frames. The doublers are, in particular, used as crack-stopping devices arranged on the inside of the aircraft skin. If during the use of the component to be manufactured a crack appears in the exterior skin of the component, and if this crack grows, with a corresponding design and arrangement of the doublers said crack will only grow to the region of the exterior skin with a doubler, but no further. In this way the damage tolerance of such structures can be improved, and discovery of any damage to the component during visual inspection can be facilitated.

In the method according to the invention, in some sections between the prepreg semifinished product for forming the shell component and the prepreg semifinished product for forming a structural component at least one layer of a dry semifinished textile product for forming an interim layer on the prepreg semifinished product can be applied. In this arrangement, in particular, prior to curing the assembly comprising the pre-cured prepreg semifinished product for the skin section and the prepreg semifinished product for the structural component the semifinished textile product can be resin-impregnated by means of an RTM process and/or an injection method.

As a matrix material for the prepreg semifinished product and/or for impregnating the dry semifinished textile product a material with a $10\char`\^5$ m·Pa·s±20% can be used.

Preferably, the at least one semifinished textile product is at least in some sections applied to the cladding field between the semifinished product for the cladding field and the semifinished product for the at least one primary component. In this manner the difference in stiffness between the stiffness of the primary components and the stiffness of the cladding field can be adapted, and sudden changes in stiffness can at least be minimised.

The at least one layer comprising semifinished textile product can be positioned on the cladding field by means of a production device, for example one or several templates.

The primary components or backing components of the cladding of the component to be manufactured can be stringers, transverse frame elements and/or frame components, e.g. door frames or window frames. In a corresponding manner the semifinished textile product is arranged on the prepreg semifinished product to form the cladding field. The semifinished textile product to form the primary component is, in particular, arranged on the cladding field before said semifinished textile product is impregnated. The semifinished textile product to form the primary component is, in particular, affixed to the cladding field by means of the second curing step.

The prepreg semifinished product to form the cladding field can, in particular, comprise at least one section from which an opening of the component to be manufactured, e.g. a window cutout or door cutout, is formed. In this arrangement, furthermore, it can be provided for the semifinished textile product to form the primary component or reinforcement component to be applied to the prepreg semifinished product in such a manner that said prepreg semifinished product at least in some sections extends along an edge section or along the edge of the opening. In this way it is possible to achieve weight-optimised reinforcement of the cladding edge region of the cutout or of the opening.

In an exemplary embodiment of the method the at least one semifinished textile product by its three-dimensional arrangement on the prepreg semifinished product is formed as a reinforcement profile of a cladding field, in particular in order to absorb bending forces of the cladding field. In this arrangement, during the manufacture of the component the semifinished textile product can at least in some sections be stabilised or affixed by one or several removable support profiles.

The semifinished textile products used according to the invention for manufacturing the reinforcement profiles can be manufactured largely in an automated manner and thus economically. The semifinished textile product preferably comprises at least one textile fabric comprising carbon fibres, glass fibres and/or aramid fibres and is prefabricated by means of sewing, braiding, weaving, embroidering and/or bonding. In particular, the semifinished textile product can be arranged on the cladding field in the form of a woven material, interlaid scrim, multiaxial woven material, knitted fabric, nonwoven fabric and/or braided fabric. In a preferred embodiment of the method according to the invention the semifinished textile product is impregnated by means of a resin transfer moulding (RTM) process. In this arrangement a vacuum can be generated for resin injection.

In the method-related steps according to the invention it can, in particular, be provided for the viscosity of the matrix material for the prepreg semifinished products and/or for impregnating the semifinished textile products to be set in such a manner that a required fibre-to-resin ratio in particular in the region of 60/40±15% is attained. The viscosity of the matrix material used is, in particular, around $\eta=10^5$ m·Pa·s±20%. For example, an epoxy resin is used as a matrix material for impregnating the semifinished fibre material.

In order to receive excess matrix material, in addition or as an alternative to the viscosity setting, a nonwoven fabric can be inserted in the mould. Nonwoven fabrics take up excess resin in order to maintain the fibre-to-resin ratio, and prevent negative characteristics from forming as a result of excess quantities of injected resin.

Curing the combination of the prepreg semifinished product for the cladding field and the semifinished textile product arranged on said cladding field is preferably carried out in an autoclave. Curing preferably takes place according to a predetermined temperature profile and vacuum profile under pressure in the autoclave, in particular depending on the materials characteristics of the injection resin used. In this arrangement the process parameters can be set and optimised with reference to the materials values of the injection resin. In this arrangement it is not necessary to take into account any dependency of the temperature profile and/or of the vacuum profile and/or of the materials values on the materials characteristics of the prepreg resin, and consequently a strength-optimised and weight-optimised component is achieved.

In the above-mentioned agreement of the courses of fibres and stress lines in prepreg and/or textile semifinished products and/or bandage arrangements, in this context in particular a deviation of 10% is permitted. In other words, in this case the directional angle of the fibre orientation can differ by 10% from the directional angle of the stress path, in each case relative to the longitudinal direction of the cladding or of the component. The section of the fibre orientation with this agreement with permitted deviation can, in particular, be 5% of the length of the respective semifinished product. In this context the term "action" refers, in particular, to a main load case of the component, thus e.g. in the case of an aircraft fuselage part a main load case for the entire aircraft, which main load case typically occurs during takeoff, landing and/or cruising according to the requirements.

The fibre-composite component manufactured with the method according to the invention can, in particular, be a fuselage segment of an aircraft with a door frame unit or window unit, which fuselage segment comprises a cladding field made from a prepreg semifinished product, and a primary component or reinforcement component, laid onto the aforesaid, which is manufactured from a semifinished textile product, wherein the semifinished textile product has been impregnated with matrix material and has been cured.

According to a further aspect of the invention, a fibre-composite component with at least one structural component and with a skin section with a recess, which skin section is connected to said structural component is provided, wherein the structural component extends along at least one section of the recess to form a frame component, characterised in that the skin section comprises several arrangements, in each case of several layers of fibres, whose orientations differ at each position along the longitudinal extension of the respective prepreg semifinished mat by a maximum of 2.5 degrees from each other, wherein a first section in each case comprises a direction that intersects a supporting-component section, a second section whose fibres extend at an angle to the fibres of the first section and along a further supporting-component section that follows on from the first edge section, and a third section along an edge section that follows on from the second edge section.

In the manufactured component a fibre orientation according to an exemplary embodiment of the method according to the invention can be provided, and in particular that an edge section of the recess, which edge section is near the second section, extends in a curved manner with a radius of 200 to 300 mm and the fibres of the third section extend relative to the same fibres of the first section, when viewed across their longitudinal direction, so as to be offset from each other by between 100 and 200 mm. In this arrangement, in particular, furthermore, an edge section of the recess, which edge section is near the second section, can extend in a curved manner with a radius of 100 to 200 mm, and the fibres of the third section can extend relative to the same fibres of the first section, when viewed across their longitudinal direction, so as to be offset from each other by between 200 and 400 mm. The recess of the fibre-composite component can comprise an edge line that is closed along the circumference, and the structural component can at least extend along a section of the edge of the recess.

According to a further aspect of the invention, a fibre-composite fuselage component of an aircraft comprises a shell component with at least one recess and with a structural component that is formed as a frame component, with the aforesaid extending around the edge line of the recess of the aircraft fuselage so as to reinforce it, and comprising: supporting-component sections that extend along the circumferential direction of the shell component; edge sections and corner regions that extend along the longitudinal direction of the shell component, which in each case connect a supporting-component section that extends in circumferential direction of the shell component with an edge section that is situated adjacent to the aforesaid and that extends in longitudinal direction of the shell component. The recess can, in particular, form a window cutout or door cutout of the fuselage component.

BRIEF DESCRIPTION OF THE DRAWINGS

Below, exemplary embodiments of the invention are described with reference to diagrammatic drawings which show the following.

DETAILED DESCRIPTION OF THE INVENTION

According to the invention, a component is produced or a component is provided which comprises a combination of a structural component or primary component and a shell section or skin section or a cladding section. The skin section can, in particular, be a curved shell section of the fibre-composite component to be manufactured, which fibre-composite component is formed in a manner that is to be described three-dimensionally.

The skin section or cladding section or the cladding field can, in particular, comprise a recess 16 that comprises an edge line 16a that is closed or leads around the circumference, i.e. is situated in the interior of the skin section, or can be an open recess, which is thus situated at the edge of the skin section 2 and is not completely surrounded by the skin section 2. In the embodiment of the recess 16 as a closed recess, the aforesaid can in particular be designed as opening for a door to be incorporated in the skin section 2, or for a window to be incorporated in the skin section 2. The structural component 8 can, in particular, be a structural part that extends along the edge 16a or along a section of the edge 16a of the recess 16 for reinforcing the respective edge line of the recess. According to the invention, the structural component is generally a component that is structurally connected to the skin section, which supports the main section in a sheet-like manner or over a narrow region when compared to the sheet-like extension of the skin section, and stabilises said skin section against external forces. For example, the structural components can be stringers or frame elements of an aircraft shell, and in particular of an aircraft fuselage.

Based on the design of a structural connection of at least one structural component or primary component 8 on the skin section 2, during operation of the component to be manufactured, when external forces occur that act on the component, stress lines occur in the skin section 2, which stress lines are curved in some sections. In the manufacture according to the invention of the component 1, first a multitude of prepreg semifinished mats 4 are applied to a mould to form the skin section 2. In this arrangement, layers of prepreg semifinished mats 4 to form a skin section blank are laid on a mould to form the skin section 2 with the recess 16, which within predetermined limits comprise fibres that extend in a uniform manner. In this context, the notion of uniform extension of the fibres of a mat within predetermined limits means that the orientations of said fibres at each position along the longitudinal extension or along a length coordinate of the respective prepreg semifinished mat differ at most by 2.5 degrees from each other. The prepreg semifinished mats can, in particular, be of an elongated form so that the longitudinal extension or the length coordinate extends along the longer side of the respective prepreg semifinished mat. With the above-mentioned measure of a fibre deviation at each position of the length coordinate of a maximum of 5 degrees relative to each other, the fibres of the prepreg semifinished mats extend approximately in a straight line. This means that these prepreg semifinished mats 4 are formed in such a manner that their fibres extend in a straight line with a deviation of at most 5 degrees from a longitudinal direction of the respective mat. In this arrangement part of the prepreg semifinished mats 4 are laid in such a manner that the fibres extend in some sections in a curved line, when viewed in longitudinal direction of the fibres F or of the prepreg mats, corresponding to an assumed force flow path or stress flow path in the cladding field 2 when the component 1 to be manufactured is in use. The prepreg semifinished product or the respectively used prepreg semifinished mat 4 comprises fibres of adequate length, which fibres follow the stress lines at least in some sections so that the fibres extend in a cured manner in some sections. The fibre length can also be considerably shorter than the respectively viewed stress line, and the stress line can be reproduced by several fibres, arranged one behind the other, of the prepreg semifinished product 4.

Figure 3:
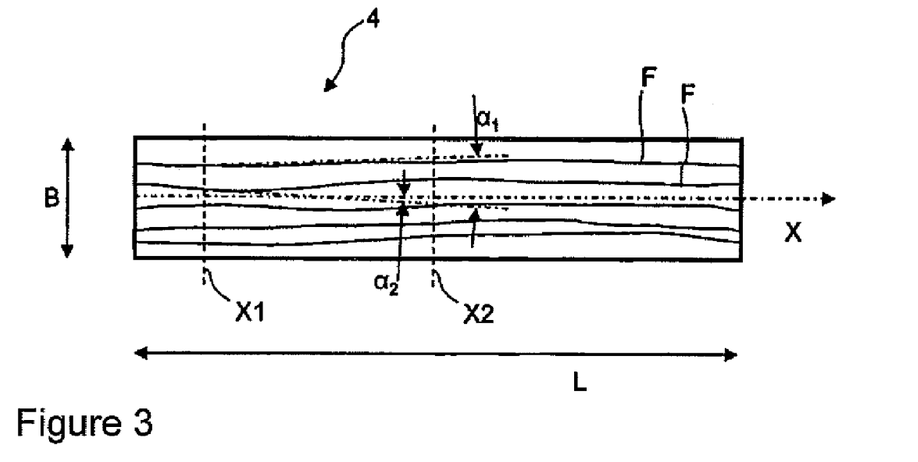
FIG. 3 illustrates a diagrammatic view of a prepreg semifinished product, used in the method according to the invention to form the shell component and to form the structural component, in its initial state prior to being laid on the mould or on an already laid prepreg semifinished product.
Figure 4:
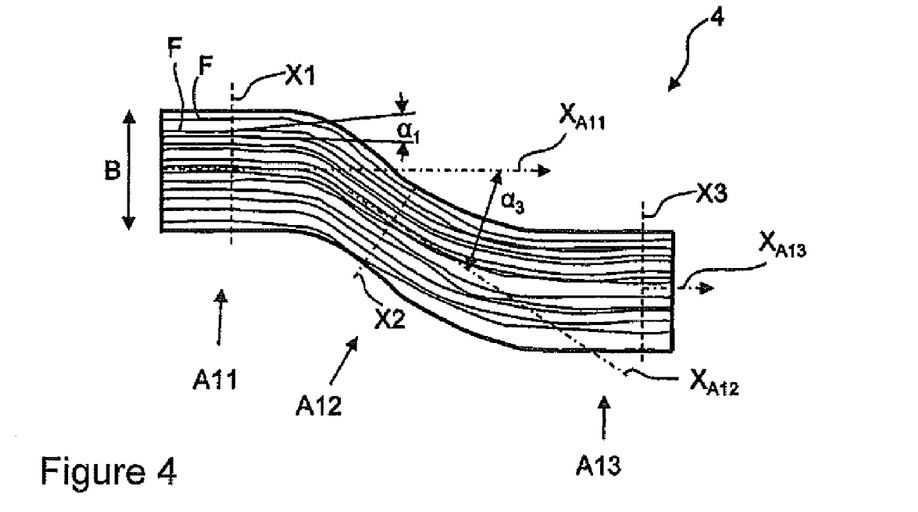
FIG. 4 illustrates the prepreg semifinished product shown in FIG. 3 which in the region and along a structural component that is to be applied to the shell component is curved in sections along the longitudinal direction, and in order to form the shell component is laid in this form on the mould or on an already laid prepreg semifinished product.

According to the invention, a multitude of prepreg semifinished mats 4 or all the prepreg semifinished mats 4 are thus formed in such a manner that their fibres extend with a deviation of a maximum of 5 degrees from the straight longitudinal extension of the respective mat, or that their fibres extend in a straight line with a deviation of a maximum of 5 degrees from the longitudinal direction of the respective mat. In this arrangement the fibre orientations differ from each other at each position along the longitudinal extension of the respective prepreg semifinished mat by a maximum of 2.5 degrees from each other (angle $\alpha 1$) and/or extend in a straight line, i.e. in this context with a deviation (angle $\alpha 2$) of a maximum of 5 degrees from the longitudinal direction of the respective mat. The fibres F of the prepreg semifinished mats 4 used are, in particular, not braided or woven, but instead extend at each position of their longitudinal extension along the longitudinal direction L of the respective prepreg semifinished mat 4. FIG. 3 diagrammatically shows a prepreg semifinished product 4, which is used to form the shell component and to form the structural component, in its initial state prior to being laid onto the mould or onto an already laid prepreg semifinished product. The prepreg semifinished mat 4 comprises a multitude of fibre strands F of which only a small selection is shown. In this arrangement the curved-line extension is shown in an exaggerated manner to illustrate the definition of the fibre orientation. The same also applies to the fibres F shown in FIG. 4. FIG. 4 shows the prepreg semifinished product shown in FIG. 3, which semifinished product in the region of and along a structural component to be applied to the shell component is curved in some sections along the longitudinal direction L and for the purpose of forming the shell component is laid in this form onto the mould or onto an already laid prepreg semifinished product.

Figure 1:
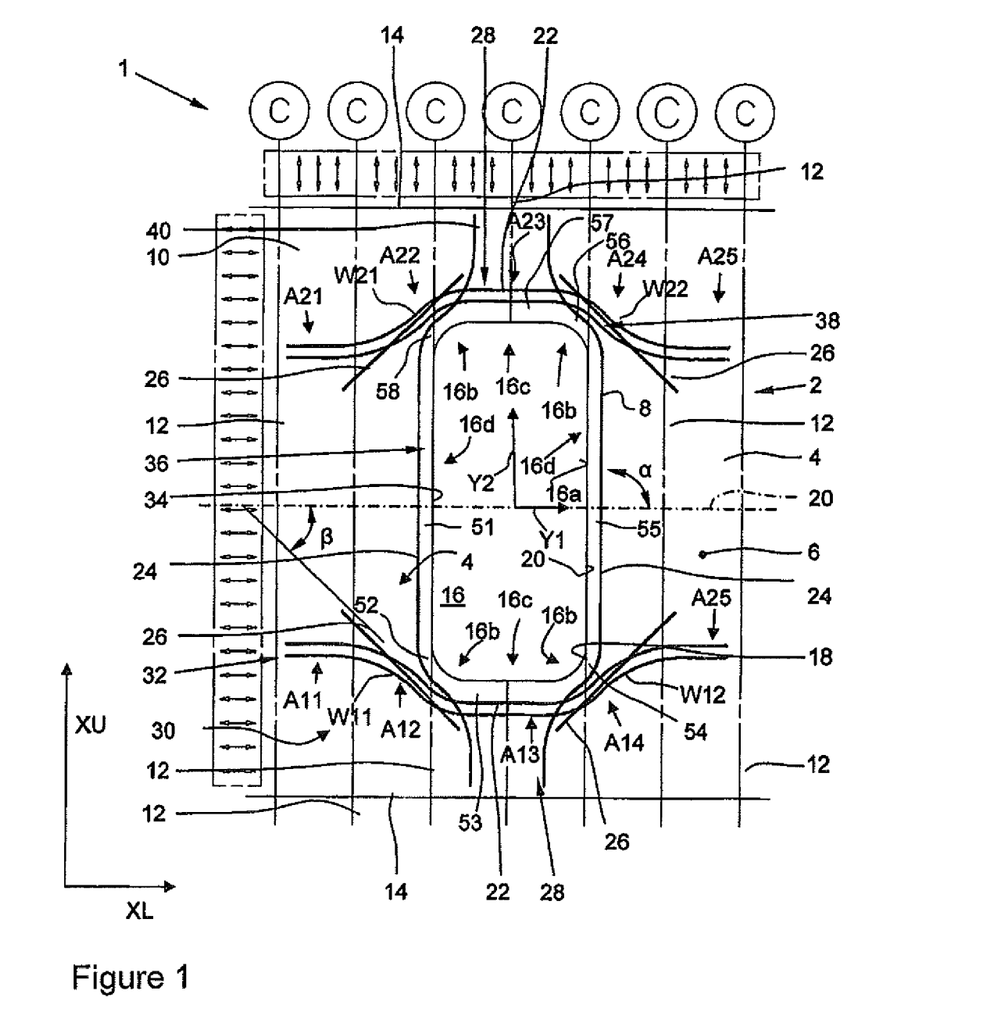
FIG. 1 illustrates a section view of a fibre-composite component according to a first exemplary embodiment of the invention with the materials used.

In order to produce a shell component or a shell section with a topology-oriented fibre orientation in the component to be manufactured, a multitude of prepreg semifinished mats 4 are laid in several layers, arranged one on top of the other, in such a manner that the fibres of the prepreg semifinished mats 4 in some sections extend along stress lines of equal inner stress, and in particular of main stress lines, which arise in the skin section of the component to be manufactured when assumed external forces act on said component. These stress lines or fibres lead around a structural component 8, as is shown in FIG. 1, and, in particular, also in the presence of a recess 16, whose edge section 16a is reinforced by a structural component 8. The structural component 8 is, in particular, of an elongated shape and extends along the edge of the recess.

According to the invention, in particular, a multitude of prepreg semifinished mats 4 are laid in such a manner that their fibres extend in a curved path at least sectionally with a change in direction of at least 15 degrees when viewed in longitudinal extension of the fibres along an edge section 16a of the recess 16. In the exemplary embodiment of a skin section, shown in FIG. 1, with a closed recess 16 the path of the stress lines, which extend along the longitudinal axis 20 and which lead towards a circumferential end region of the recess, comprises two reversal points W11, W12 or W21, W22. The stress lines, along which according to the invention fibres of the prepreg semifinished mats extend, starting from a fibre direction which exist in a section A11 or A21 being disposed remotely from a structural component 8 or the recess 16 and extending across the same, undergo a change in direction of at least 15 degrees in a subsequent section A12 and A22, respectively. In this arrangement a maximum of 75 degrees can be provided as the preferred upper limit. In a following section A13 or A23, in which the stress lines extend past the structural component 8 or the recess 16, the semifinished mats are laid in such a manner that the fibres likewise extend past the structural component 8 or the recess 16 so that the region A12 or A22 in each case comprises a reversal point W11 or W21. Further onward, the stress lines curve, as shown in FIG. 1, in reverse towards the width coordinate of the first longitudinal section A11 or A21 so that the semifinished mats are placed in such a manner that the fibres undergo a directional change of at least 15 degrees and at most 75 degrees and also in each case comprise a reversal point W12 or W22 so as in a subsequent section A14 or A24 to again be aligned with the longitudinal axis 20. In the exemplary embodiment shown, the described path also results in relation to stress lines that extend across the longitudinal axis 20 towards the or the recess and lead past said recess, so that for these stress lines, too, prepreg semifinished mats are laid in such a manner that the fibres on each side of the structural component or of the recess 16 undergo two changes in direction of in each case at least 15 degrees and at most 75 degrees.

The prepreg semifinished mats with a curved section can be laid offset relative to each other or one on top of the other or so as to overlap each other. The prepreg semifinished mats can, in particular, be rectangular in shape. Their longitudinal axis X can, in particular, be the midline between the longer facing edge lines of the prepreg semifinished mat 4. In the curved laid state (FIG. 4), in particular, longitudinal axes X-A11, X-A12, X-A13 of the respective sections A11, A12 or A13 form, which axes X-A11, X-A12, X-A13 extend at the above-mentioned angles to each other.

The produced structural component 8 can form a frame component that leads around the edge line 16a (in particular the inner edge line) of the window cutout or door cutout 16 of the aircraft fuselage and comprises supporting-component sections 51, 55 that extend along the circumferential direction XU of the shell component 2; edge sections 53, 57 and corner regions (52, 54, 56, 58) that respectively are connecting supporting-component sections 51, 55 that extend along the circumferential direction XU of the shell component 2 and edge sections 53, 57

According to the invention the prepreg semifinished mats 4, laid in several layers with at least one second section A12, A22 that in longitudinal direction extends so as to be curved, can be laid in such a manner that their first sections A11, A21 in each case comprise a direction that intersects the supporting-component sections 51, 55 that extend in circumferential direction XU of the shell component 2; the curved second section A12, A22 extends along a corner region 52, 54, 56, 58; and the third section A11 extends along an edge section 53, 57 that extends in longitudinal direction XL of the shell component. The fibres of the third section A13, when viewed across their longitudinal direction X, can extend so as to be offset between 0.1 m and 1.0 m relative to each other when compared to the same fibres of the first section A11.

As an alternative or in addition, the prepreg semifinished mats 4 whose at least one in longitudinal direction curved second section A12, A22 is placed in several layers are laid in such a manner that in each case their first sections A11, A21 comprise a direction that intersects the edge sections 53, 57 that extend in longitudinal direction XL of the shell component; the curved second section A12, A22 extends along a corner region 52, 54, 56, 58; and the third section A11 extends along a circumferential direction XU of the shell component 2. In this arrangement the fibres of the third section A13, when viewed across their longitudinal direction X, can extend so as to be offset between 0.1 m and 1.0 m relative to each other when compared to the same fibres of the first section A11.

The prepreg semifinished mats 4 for forming the structural component 8 on the skin section 2 together with prepreg semifinished mats 4 for forming the shell component 2 can be laid in such a manner that the aforesaid in relation to the longitudinal direction of the fuselage component to be manufactured form longitudinal bandage arrangements 22, circumferential bandage arrangements 24 and/or shear-type bandage arrangements 26 of the fuselage component.

The manufactured component or fuselage component comprises the described fibre orientation according to the prepreg semifinished products laid in the manner described. In order to form the structural component or the primary component 8, 12, 14 on the skin section 2, the following are carried out: the applying layers of a semifinished textile product 10 onto the cured prepreg semifinished product 4 to form the structural component 8, 12, 14; pre-curing the prepreg semifinished product 4 for stabilising the skin section blank; optionally impregnating the semifinished textile product 10 with matrix material; and curing the assembly comprising the pre-cured skin section blank and the prepreg semifinished product 10 to form the structural component.

Optionally, in addition, at least one semifinished textile product is placed as a bandage arrangement, for example a longitudinal bandage arrangement 22, circumferential bandage arrangement 24 or shear-type bandage arrangement 26, for reinforcing the component on the semifinished textile product and is impregnated with resin so that, subsequently, curing the assembly comprising pre-cured prepreg semifinished product 4, the semifinished textile product 10 to form the primary component 8, 12, 14 and the semifinished textile product 22, 24, 26 for forming at least one bandage arrangement takes place.

Generally speaking, according to the invention, when viewed in the direction of the longitudinal axis 20 of the component 1, and when viewed across the longitudinal axis 20 of the component 1, on each side of a primary component 8, 12, 14 and, in particular, of a primary component 8, 12, 14 surrounding a recess 16, at least one longitudinal bandage arrangement 22, circumferential bandage arrangement 24 and/or shear-type bandage arrangement 26 can be arranged.

In this arrangement a longitudinal bandage arrangement 22 comprises fibres which with corresponding laying of said longitudinal bandage arrangement 22 extend in longitudinal direction 20, while in this arrangement a circumferential bandage arrangement 24 comprises fibres which with corresponding laying of said circumferential bandage arrangement 24 extend across the longitudinal direction 20 or in circumferential direction of the component 1. In this design the shear-type bandage arrangement 26 comprises fibres which with corresponding laying of the aforesaid extend at an angle of between 15 and 75 degrees to the longitudinal direction 20 and at an angle of between 15 and 75 degrees to the circumferential direction of the component 1. If several bandage arrangements 22, 24, 26 are used, it is possible for bandage arrangements to cross. In special applications it is possible, in this manner, in the case of expected stress flow paths to achieve additional stabilisation and strength of the component 1.

Figure 2:
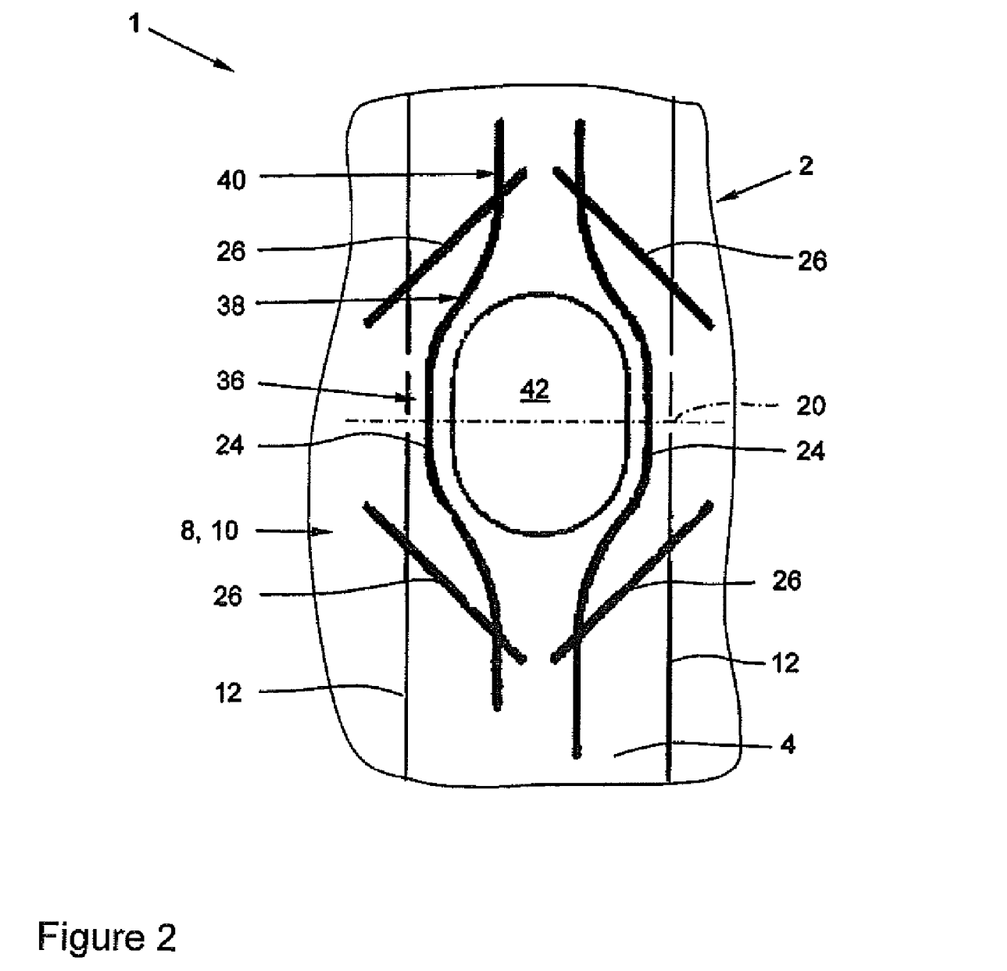
FIG. 2 illustrates a section view of a fibre-composite component according to a further exemplary embodiment according to the invention.

In FIGS. 1 and 2 the bandage arrangements 22, 24, 26 are diagrammatically shown as broken lines to illustrate their longitudinal directions because they are elongated in shape. However, the bandage arrangements comprise a width that is provided depending on the particular case, which is not shown in the figures. As an alternative or in addition, it is provided for fibres to be provided in the bandage arrangements 22, 24, 26, which fibres in some sections extend in the direction of stress flow paths.

In this arrangement when viewed in the direction of the longitudinal axis 20 of the component 1, and when viewed across the longitudinal axis 20 of the component 1, on each side of a primary component 8, 12, 14 and, in particular, of a primary component 8, 12, 14 surrounding a recess 14, several longitudinal bandage arrangements 22, circumferential bandage arrangements 24 and/or shear-type bandage arrangements 26 can be arranged, whose longitudinal directions can, in particular, at least in some sections extend parallel or at an angle to each other. In this arrangement, furthermore, in particular the circumferential bandage arrangements 24 and shear-type bandage arrangements 26 can be of identical shape or of similar shape.

Semifinished textile products for forming primary components 8, 12, 14 and, optionally, semifinished textile products or doublers for use as longitudinal bandage arrangements 22, circumferential bandage arrangements 24 and shear-type bandage arrangements 26, are placed onto the prepreg semifinished product provided to form cladding 2, which prepreg semifinished product has previously cured. The longitudinal bandage arrangements 22, circumferential bandage arrangements 24 and shear-type bandage arrangements 26 which have been laid onto the prepreg semifinished product during manufacture of the component 1 are single-layer or multilayer semifinished textile products, in each case elongated in shape, that comprise fibres that in the described manner follow the path of stress lines that arise in the cladding 2 during use of the component 1 to be manufactured, which stress lines can be identical to the ones mentioned above or can be further stress lines.

The shape of tailoring of the longitudinal bandage arrangements 22, circumferential bandage arrangements 24 and shear-type bandage arrangements 26 can correspond to the shape of the stress lines, i.e. can be elongated and can comprise a width that in some sections is constant along the longitudinal extension, and can comprise a straight and/or curved longitudinal extension. The bandage arrangements, i.e. the longitudinal bandage arrangements 22, circumferential bandage arrangements 24 and shear bandage arrangements 26, are placed onto the cured prepreg semifinished product in such a manner that the fibre orientations of the bandage arrangements correspond to the essential stress flow paths to be expected in component 1 and are to agree in a predetermined manner. Since due to the arrangement of a primary component 8, 12, 14 on the cladding 2 the stress flow paths to be expected in the cladding 2 of the component 1 during use of said component extend in some sections in a curved manner in the cladding in the region of the primary component 1, the fibres in the semifinished textile product of the bandage arrangements 22, 24, 26 also preferably extend in a curved manner, i.e. the fibre angles, i.e. the angles of the longitudinal direction of these fibres relative to a constant reference direction, change when viewed in the course of the longitudinal direction of the fibres.

By applying the bandage arrangements 22, 24, 26 to the semifinished textile product for the cladding 2, the two-stage manufacturing method comprising laying and curing the cladding 2 followed by applying the semifinished textile product for the primary component 8, 12, 14 with a further curing phase is expanded in an advantageous manner because the component 1 is reinforced in a targeted manner with reference to the stress lines that occur in the component 1. In this manner the strength and stability of the component 1 is improved while maintaining optimum weight.

The notion of longitudinal direction of a bandage arrangement 22, 24, 26 refers to the longitudinal direction of the fibres in the respective bandage arrangement, which fibres can comprise a position-dependent and thus constant or non-constant orientation. The longitudinal direction or the longitudinal axis 20 of the component results from the shape of the component 1 to be manufactured. If said component 1 is overall of an elongated longitudinal shape, the longitudinal direction of the component extends in the longitudinal extension of the component. If the component 1 is an aircraft fuselage or an aircraft fuselage component, the longitudinal direction of the component extends in the direction of the longitudinal axis of the fuselage. If several recesses 16 are provided in the cladding 2, the longitudinal direction can be the direction in which the recesses 16 are arranged one behind the other.

FIG. 1 shows a fibre-composite component 1 with the characteristics relevant to its manufacture. The component 1 comprises a cladding field 2 which can, in particular, be part of an aircraft fuselage-cladding field that forms the outer skin of an aircraft. The cladding field 2 comprises a prepreg semifinished product 4. On an interior surface 6 of the cladding field 2, primary components or reinforcement components 8 in the form of (diagrammatically indicated) transverse frame elements 12 and stringers 14 are provided that are manufactured from semifinished textile products 10. The component 1 in the embodiment shown comprises a cladding field 2 with a rectangular window cutout 16 with rounded corner regions 18, as well as transverse frame elements 12 and stringers 14 applied to the cladding field 2 and arranged beside the window cutout 16 as primary backing components. Furthermore, additional frame elements (not shown) can be arranged.

In order to form the skin layer structure of the cladding field 2 a prepreg semifinished product 4 has been applied to a mould (not shown) and has been subsequently cured. A CFP prepreg was used as a prepreg semifinished product 4, which CFP prepreg comprises fibres which extend in a curved line in some sections and which in particular comprise fibre orientations that differ from each other, corresponding to the stress flow paths in the cladding 2 of the component 1 to be manufactured, which component 1 comprises primary components 8, 12, 14. This means that the fibre angles, in other words the angles of the longitudinal direction of these fibres relative to a reference direction, change when viewed in the course of the longitudinal direction of the fibres. In this arrangement the orientations of the fibres are provided in such a manner that the fibres extend at least in some sections along force flow lines or stress lines which during operation of the component 1 to be manufactured with a cladding and at least one primary component 8, 12, 14 arise. These force flow lines or fibres extend, in particular, starting from a longitudinal direction of the cladding field at a curvature in which the fibres are increasingly aligned in the direction of the longitudinal direction of the primary component 8, 12, 14, which direction the primary component 8, 12, 14 has at the position at which the imaginary extension of the longitudinal extension according to the first-mentioned longitudinal direction of the fibres meets the primary component 8, 12, 14. Depending on the design of the cladding field 2 and/or of primary components 8, 12, 14, for example, an interior-pressure-dimensioned layer design with a fibre angle sequence of 10°/30°/60° (S13) or a shear-dimensioned layer design with a fibre angle sequence of 30°/60°/10° (S18) relative to the longitudinal axis 20 of the component 1 can be provided.

For manufacturing the cladding field 2 the prepreg semifinished product 4 can be applied to the mould by means of a fibre placement apparatus in order to provide fibres with predetermined orientations. In this way the non-productive times associated with manual work can be reduced to a minimum while providing high manufacturing quality.

For manufacturing the cladding field 2 the applied prepreg semifinished product 4 is subsequently cured in an autoclave according to a predetermined temperature profile and pressure profile.

In a further process step a single layer or multilayer layer comprising a semifinished textile product 10 is arranged on the cured cladding field 2, wherein said cladding field 2 preferably at least in some parts comprises fibre orientations that extend in the direction of the force flow path and stress path in the primary component 8, 12, 14 during use of the overall component 1.

The semifinished textile product 10 can preferably comprise at least one textile fabric comprising carbon fibres, glass fibres and/or aramid fibres and can be prefabricated by means of sewing, braiding, weaving, embroidering and/or bonding. Preferably, the semifinished textile product 10 is arranged in the cladding field 2 in the form of a woven material, interlaid scrim, multiaxial woven material, knitted fabric, nonwoven fabric and/or braided fabric. In the shown exemplary embodiment of the invention semifinished textile products 10 have been applied to the cladding field 2 as doublers in the form of longitudinal bandage arrangements 22, circumferential bandage arrangements 24 and shear-type bandage arrangements 26 so that a doubler arrangement or patch arrangement arises that integrally reinforces the cladding field 2.

The doublers 22 designed as longitudinal bandage arrangements comprise, in particular, longitudinal force flow-path fibres, and the longitudinal bandage arrangements or fibres of said longitudinal bandage arrangements extend in some sections parallel to the longitudinal axis 20 of the component or of the cladding field 2 on the component. If the component 1 is a fuselage or fuselage segment of an aircraft, longitudinal bandage arrangements on the cladding field are provided which in the installed state extend in longitudinal direction of the fuselage. If a window cutout is provided, the longitudinal bandage arrangements 22 in their longitudinal direction follow the course of force lines and stress lines that extend in longitudinal direction of the component and extend so as to be spaced apart from the contour of the top or bottom of the window cutout 16. The force lines and stress lines and the longitudinal bandage arrangements thus extend from a first section, which section or the fibres of which section extends/extend in the direction of the longitudinal axis of the component, in a streamlined manner around the window cutout 16. Preferably, the longitudinal bandage arrangement which extends in the longitudinal axis of the component, which longitudinal bandage arrangement when viewed across the longitudinal axis extends at the height of the cross extension of the window cutout 16, extends at a larger distance when viewed in longitudinal direction in a straight line in front of the window cutout; is curve-shaped near the window cutout, thus changing its direction in such a manner that said longitudinal bandage arrangement leads in a streamlined manner around the window cutout 16. When viewed in its longitudinal direction, the longitudinal bandage arrangement can extend in a straight line or in a curved manner in a section or middle region 28 along the window cutout 16. Behind the centre axis of the window cutout, which centre axis extends across the longitudinal axis 20 of the component 1, the longitudinal bandage arrangement then preferably extends, so as to be symmetrical to the centre axis of the window cutout 16, in the manner described above. Thus the longitudinal direction of the longitudinal bandage arrangement extends from the above-mentioned first section by way of a curved section and the middle region 28, again by way of a curved section 30, before preferably making a transition to a straight longitudinal section 32.

With the application of the invention to a component 1 that is an aircraft fuselage, wherein the recesses 16 of said component 1 are window cutouts, longitudinal bandage arrangements 22 or fibres of the aforesaid extend in particular along a region in which several windows are situated, arranged one behind the other in the longitudinal axis 20 of the aircraft fuselage. Preferably, the circumferential bandage arrangement extends so as to be symmetrical relative to the centre axis of the window cutout 16, which centre axis extends, for example, in the longitudinal axis of the component 1. When viewed in the longitudinal axis of the component the circumferential bandage arrangement extends outside the recess 16 in circumferential direction of the component 1 or fuselage component to be manufactured, or across the longitudinal axis of the aforesaid, and towards the recess 16, and from a distance from the recess 16 extends in a curved manner so as to move out of the way of, or so as to go around, said recess 16 in a streamlined manner, i.e. the circumferential bandage arrangement extends in a direction at which the circumferential bandage arrangement 24 moves away from the centre axis of the recess 16, which centre axis extends in circumferential direction of the component, and in a direction in which the circumferential bandage arrangement 26 leads around the recess 16. In the further course of the circumferential bandage arrangement 24 in the circumferential direction of the component 1, said circumferential bandage arrangement 24 leads along the recess 16, past said recess 16, and in some sections preferably in a straight line. Furthermore, doublers 24 as semifinished textile products designed as circumferential bandage arrangements 22 can comprise force flow fibres in the circumferential direction of the finished component 1 or of the fuselage or fuselage segment (fuselage component), wherein the aforesaid in some sections extend across, or at an angle α of 90°±15% relative to the longitudinal axis 20 of the component 1 and thus of the cladding field 2. The course of the circumferential bandage arrangement 24 on a recess 16 that is present or that is provided in the cladding 2 is thus streamlined so that the circumferential bandage arrangement 24 extends around the recess 16.

In the region of the recess 16 or of a window cutout 16 the circumferential bandage arrangements 24 or the fibres of said circumferential bandage arrangements 24 extend on both sides of the recess 16 relative to the centre axis of the recess 16, which centre axis extends, for example, across the longitudinal axis 20 of the component 1, and corresponding to the force flow path and stress flow path extend at a distance from the contour of lateral regions 34 of the recess 16 so that the bandage arrangements comprise a centre section 36 that on each side makes a transition to a circumferential section 40 by way of a curved section 38. The curved sections 38 are designed as radii in such a manner that the middle sections and circumferential sections 36, 40 of adjacent circumferential bandage arrangements 24 in some sections extend so as to be parallel to each other, thus in some sections covering the longitudinal bandage arrangements 22 in the region of the curved sections 30.

The furthermore provided doublers 26, which are designed as sheet-like shear-type bandage arrangements 26, are arranged so as to be spaced apart from the four corner regions 18 of the window cutout 16, wherein said doublers 26 can comprise shear-type fibres that for the purpose of transmitting shear forces and shear stress extend at an angle β of ±45°±15° relative to the longitudinal axis 20 of the component 1 or fuselage or of the cladding field 2. The shear-type bandage arrangements 26 or fibres of said bandage arrangements 26 can extend in a straight line beside the circumferential bandage arrangements 24, and in each case can in some sections cover the longitudinal bandage arrangements 22 in the region of their curved sections 30. In one embodiment of the invention the shear-type bandage arrangements 26, which extend outside the recess, extend along the longitudinal axis 20 of the component 1 when viewed from a longitudinal axis position, which also comprises the interior of the recess 16, up to a longitudinal axis position that when viewed from that position is situated beyond the semifinished product for the primary component 8, 12, 14.

The described doublers 22, 24, 26 are designed so as to be sheet-like patches and are applied to the cladding field 2. In one method according to the invention, positioning of the doublers 22, 24, 26 on the cladding field 2 takes place by means of a manufacturing apparatus (not shown) with the use of several templates. In this way weight-optimised reinforcement of the window cutout 16 is achieved. The doublers 22, 24, 26 are applied to the cladding field 2 in sections between the cladding field 2 and the primary components 12, wherein the semifinished textile products for the primary components 12 are, in particular, arranged on the cladding field 2 prior to the impregnation of the semifinished textile product 10.

The semifinished textile product 10 is subsequently impregnated with matrix material by means of a resin transfer moulding (RTM) process, wherein preferably a vacuum build-up for the resin injection is provided. In the injection phase a partial vacuum is created in the mould, and the semifinished textile products 10 are impregnated with the injection resin that is supplied by way of a feed line (not shown). There are an associated resin reservoir and conveying means for supplying the resin (neither of them shown in the figure). An epoxy resin is used as a matrix material for impregnating the semifinished fibre product 10. The viscosity of the resin is set in such a manner that a required fibre-to-resin ratio, in particular, in the region of 60/40±15% is attained. The viscosity of the matrix material used is, in particular, Nü=10^5 m Pas±20%.

In order to take up excess matrix material, in addition or as an alternative to setting the viscosity, a nonwoven fabric can be inserted in the mould. The nonwoven fabrics take up excess resin in order to maintain the fibre-to-resin ratio, and prevent negative characteristics from forming as a result of excess quantities of injected resin. In this way it is possible to prevent the occurrence of locations with resin build-up, in particular in the corner regions 18 of the window frames.

Subsequently, the fibre-composite component 1 is cured or hardened. Curing the semifinished textile product 10 arranged on the cladding field 2 can be carried out in a vacuum-assisted manner in an autoclave at a predetermined temperature profile, pressure profile and vacuum profile depending on the materials characteristics of the injection resin. In other words, according to the invention, curing of the fibre-composite component takes place in two hardening steps, wherein in a first step the prepreg semifinished product 4 is hardened, and in a second step the impregnated semifinished textile product 10 is hardened together with the precured prepreg semifinished product 4 so that a high quality laminate is achieved between the cladding field 2 and the reinforcement components 8. In this way the stringent requirements relating to the component quality of aviation components, for example a low pore count, a certain fibre volume content, and the interior laminate quality, can be met. Furthermore, it is advantageous if the layer structure of the reinforcement parts 8 on the cladding field 2 is implemented in a topology-oriented manner with a fibre angle orientation that matches the force flow path and stress flow path.

In an exemplary embodiment of the invention (not shown) the semifinished textile product 10 comprises a three-dimensional design, in particular in order to absorb bending moments of the cladding field 2. In this arrangement the semifinished textile product 10 is affixed, during the manufacture of the fibre-composite component 1, in some sections by removable support profiles.

FIG. 2 shows an exemplary embodiment of the invention with a cladding field 2 which differs from the exemplary embodiment shown in FIG. 1 in that it comprises an approximately oval window cutout 42. Based on the force flow path or stress flow path in the region of the approximately round window cutout 42, in this application case no longitudinal bandage arrangements are used, but instead circumferential bandage arrangements 24 and shear-type bandage arrangements 26 are laid onto the cladding field 2.

In this application case, when viewed across the longitudinal axis of the component or fuselage component, in each case a doubler is laid as a circumferential bandage arrangement 24 onto the cladding field 2, wherein the longitudinal direction in some sections extends in a curved manner and thus across the longitudinal axis of the component or fuselage component. The circumferential bandage arrangements 24 extend across and corresponding to the force flow path in the component at a predetermined distance, preferably in some sections in a straight-line manner, e.g. at an angle of approximately 90° relative to the longitudinal axis 20 of the component or of the cladding field 2. From this region of the circumferential bandage arrangement that in relation to the longitudinal axis 20 of the component is present on both sides of the recess, which region is remote from the recess, each circumferential bandage arrangement 24 extends according to the force flow path and stress flow path of the component, spaced apart from the contour of the window cutout 42 in a streamlined manner past said window cutout 42. Thus the circumferential bandage arrangements 24 in each case comprise two regions that are remote from the recess, which regions in relation to the longitudinal axis 20 of the component are opposite each other, and a centre section 36, situated between these regions, wherein the transition that is present on both sides takes place from the region that is remote from the recess to the centre section 36 by way of in each case a curved section 38 with a reversal point of curvature.

Furthermore, doublers in the form of shear-type bandage arrangements 26 are arranged on the cladding field in order to transmit shear forces and shear stress that occur in the component. The shear-type bandage arrangements 26 extend along, and spaced apart from, the four corner regions 18 of the window cutout 16, and at an angle to the longitudinal axis 20 of the component; in other words the longitudinal directions of said shear-type bandage arrangements 26 extend at an angle of between ±10 and ±80 degrees and, in particular, of between ±30 and ±60 degrees relative to said longitudinal axis 20 of the component. In the exemplary embodiment shown, the shear-type bandage arrangements 26 are designed so as to be in a straight line. Furthermore, each shear-type bandage arrangement has been laid in such a manner that it crosses a circumferential bandage arrangement 24 located at its side.

In those cases where the at least one recess is not formed so as to be symmetrical relative to the respectively viewed longitudinal direction, instead of the centre axis the area line of gravity of the recess in the respectively viewed direction is to be taken.

Disclosed is a method for manufacturing a fibre-composite component 1 with a cladding field 2, in particular an aircraft fuselage-cladding field, comprising a prepreg semifinished product 4 that comprises at least one reinforcement component 8 made of a semifinished textile product 10, wherein the prepreg semifinished product 4 to form the cladding field 2 is applied to a mould and is cured. In a further work step the semifinished textile product 10 is arranged on the cured cladding field 2 and is impregnated with matrix material. Subsequently, the semifinished textile product 10 is cured together with the prepreg semifinished product 4.

The invention claimed is:

1. A method for manufacturing a fibre-composite component, wherein the method comprises the following steps:
providing at least one structural component extending along at least one edge section of a recess to form at least a frame component along the edge section of the recess; and
providing a skin section formed of a plurality of layers of prepreg semifinished mats, each prepreg semifinished mat including a plurality of fibres extending longitudinally in a substantially parallel configuration, where the skin section is connected to said structural component such that the structural component and layers of the skin section are formed as one piece, wherein the step of providing the skin section includes:
applying the layers of the prepreg semifinished mats as skin-section blanks to a mould to form the skin section, wherein the prepreg semifinished mats in an initial state are such that the fibers extend along a longitudinal direction of the prepreg semifinished mats,
applying a multitude of the prepreg semifinished mats as layers in such a manner that at least some of the fibres extend along the longitudinal direction toward the edge section of the recess, and extend in a curved path with a change in direction of at least 15 degrees relative to the longitudinal direction as such fibres are closer to the edge section of the recess, and extend along the edge section of the recess along lines of equal stress, when exposed to external forces, which lines lead around the edge section of the recess;
pre-curing the prepreg semifinished mats in order to stabilise at least one skin-section blank;
applying layers of a prepreg semifinished product to form the structural component a cured skin-section blank;
curing the assembly comprising the prepreg semifinished mats for the skin section and the prepreg semifinished product for the structural component.

2. The method according to claim 1, wherein:
the fibres extend such that they deviate by at most 5 degrees from the longitudinal direction of the respective prepreg semifinished mat, and the prepreg semifinished mats are applied to the mould to form the skin section such that a first section extends in a non-curved state in the longitudinal direction relative to the initial state;
at least one second section extends in a curved manner in the longitudinal direction relative to the initial state with a largest change in direction of at least 15 degrees relative to the longitudinal extension of the fibres in the initial state of the respective prepreg semifinished mat; and
a third section extends in a non-curved state in the longitudinal direction relative to the initial state.

3. The method according to claim 1, wherein:
a multitude of the prepreg semifinished mats are laid in several layers in such a manner that a first section of at least 0.5 m length in an uncurved state extends in the longitudinal direction relative to the initial state of the respective prepreg semifinished mat;
at least one second section of at least 2.0 m length in a curved state extending along the curved path extends along the longitudinal direction, when compared to the initial state, at a maximum change in direction of at least 15 degrees relative to the longitudinal extension of the fibres in the initial state of the respective prepreg semifinished mat; and
a third section of at least 0.5 m length extends in the uncurved state of the prepreg semifinished mat when compared to the initial state.

4. The method according to claim 1, wherein the prepreg semifinished mats comprise a width of between 0.5 m and 2.0 m and a length of between 4 m and 25 m.

5. The method according to claim 3, wherein the edge section of the recess, which section is in close proximity to the second section, extends in a curved manner at a radius of 200 to 300 mm, while the fibres of the third section extend across the longitudinal direction when viewed in the longitudinal direction of the fibres of the first section so as to be offset between 100 and 200 mm relative to each other.

6. The method according to claim 3, wherein the edge section of the recess, which edge section is in close proximity to the second section, extends in a curved manner at a radius of 100 to 200 mm, and in that the fibres of the third section when viewed in their longitudinal direction extend across the fibres of the first section so as to be offset between 200 and 400 mm relative to each other.

7. The method according to claim 1, wherein the recess comprises an edge line that is closed along a circumference, wherein the structural component extends at least along a section of the edge of the recess.

8. The method according to claim 1, wherein the component manufactured is a fuselage component of an aircraft.

9. The method according to claim 8, wherein the recess forms a window cutout or door cutout of the fuselage component.

10. The method according to claim 1, wherein the structural component on the component manufactured is at least one of a stringer and a transverse frame element of an aircraft fuselage.

11. The method according to claim 1, wherein the structural component manufactured forms a frame component that encompasses an edge line of a window cutout or door cutout of an aircraft fuselage and comprises:
  supporting-component sections that extend along a circumferential direction of a shell component;
  edge sections that extend along a longitudinal direction of the shell component; and
  edge sections which include corner regions that are located adjacent to the edge sections that extend along a longitudinal direction of the shell component, and that connect the edge sections that extend along the longitudinal direction of the shell component and the respective supporting-component sections that extends in the circumferential direction of the shell component.

12. The method according to claim 11, wherein:
  the prepreg semifinished mats, having at least one second section that is curved in the longitudinal direction is placed in several layers, are laid in such a manner that in each case first sections thereof comprise a direction that intersects the supporting-component sections that extend in the circumferential direction of the shell component;
  the curved second section extends along at least one of the corner regions; and
  a third section extends along at least one of the edge sections that extends along the longitudinal direction of the shell component.

13. The method according to claim 12, wherein the fibres of the third section, when viewed across the longitudinal direction, extend so as to be offset between 0.1 m and 1.0 m relative to each other when compared to the fibres of the first section.

14. The method according to claim 11, wherein:
  the prepreg semifinished mats, whose at least one second section that is curved in longitudinal direction is placed in several layers, are laid in such a manner that in each case first sections thereof comprise a direction that intersects the edge sections that extend in the longitudinal direction of the shell component;
  the curved second section extends along at least one of the corner regions; and
  a third section extends along a supporting-component section that extends along the circumferential direction of the shell component.

15. The method according to claim 14, wherein the fibres of the third section, when viewed across the longitudinal direction, extend so as to be offset between 0.1 m and 1.0 m relative to each other when compared to the fibres of the first section.

16. The method according to claim 1, wherein the prepreg semifinished mats for forming the structural component are laid on a main section together with prepreg semifinished mats for forming a shell component in such a manner that in relation to the longitudinal direction of the component to be produced they form at least one of longitudinal bandage arrangements, circumferential bandage arrangements and shear-type bandage arrangements of the component.

17. The method according to claim 1, wherein in some sections between the prepreg semifinished product for forming a shell component and the prepreg semifinished product for forming the structural component, at least one layer of a semifinished textile product for forming an interim layer on the prepreg semifinished product is applied.

18. The method according to claim 1, wherein prior to curing the assembly comprising the pre-cured prepreg semifinished product for the skin section and the prepreg semifinished product for the structural component, a semifinished textile product is resin-impregnated by means of at least one of a resin transfer moulding process and an injection method.

19. The method according to claim 1, wherein matrix material with a viscosity of 10^5 m Pas±20% is used.

20. The method according to claim 1, wherein the fibres of the prepreg semifinished mats for the skin section and the structural component are at least one of carbon fibres, glass fibres and aramid fibres.

21. A fibre-composite component, comprising:
  at least one structural component extending along at least one edge section of a recess to form at least a frame component along the edge section of the recess; and
  a skin section formed of a plurality of layers of prepreg semifinished mats, each prepreg semifinished mat including a plurality of fibres extending longitudinally in a substantially parallel configuration, where the skin section is connected to said structural component, such that the structural component and layers of the skin section are formed as one piece,
  wherein the plurality of layers of the prepreg semifinished mats are applied such that: (i) at least some of the fibres extend along a longitudinal direction toward the edge section of the recess, and extend in a curved path with a change in direction of at least 15 degrees relative to the longitudinal direction as such fibres are closer to the edge section of the recess; and (ii) the fibres extend along the edge section of the recess along lines of equal stress, when exposed to external forces, which lines lead around the edge section of the recess.

22. The fibre-composite component according to claim 21, wherein:
  the at least some of the fibres that extend along the longitudinal direction toward the edge section of the recess are defined as being in a first section of the skin section;
  the at least some of the fibres that extend in the curved path are defined as being in a second section adjacent to the first section of the skin section and are oriented in a curved manner with a radius of 200 to 300 mm; and
  the at least some of the fibres of a third section adjacent to the second section of the skin section extend substantially parallel and offset by between 100 and 200 mm relative to the at least some of the fibers of the first section, when viewed in the longitudinal direction.

23. The fibre-composite component according to claim 21, wherein:
  the at least some of the fibres that extend along the longitudinal direction toward the edge section of the recess are defined as being in a first section of the skin section;
  the at least some of the fibres that extend in the curved path are defined as being in a second section adjacent to the first section of the skin section and are oriented in a curved manner with a radius of 100 to 200 mm; and
  the at least some of the fibres of a third section adjacent to the second section of the skin section extend substantially parallel and offset by between 200 and 400 mm relative to the at least some of the fibers of the first section, when viewed in the longitudinal direction.

24. The fibre-composite component according to claim 21, wherein the edge section of the recess comprises an edge line that is closed along a circumference, and the structural component extends at least along the edge section of the edge line of the recess.

25. The fibre-composite component according to claim 21, wherein:
  the at least some of the fibres that extend along the longitudinal direction toward the edge section of the recess are defined as being in a first section of the skin section, where orientations of the fibers deviate with respect to the longitudinal direction by a maximum of 5 degrees;

the at least some of the fibres that extend in the curved path are defined as being in a second section adjacent to the first section of the skin section, where the fibers extend at an angle difference of at least 15 degrees with respect to the longitudinal direction; and the at least some of the fibres of a third section adjacent to the second section of the skin section extend along the structural component along the edge section of the recess, where the fibers extend at a complementary angle difference as compared with the angle difference in the second section, such that the fibers in the third section are substantially parallel with the fibers of the first section.

* * * * *